(12) United States Patent
Cole

(10) Patent No.: US 6,419,493 B1
(45) Date of Patent: Jul. 16, 2002

(54) THREE-DIMENSIONAL SHOESTRING BOOK

(75) Inventor: Jeffrey C. Cole, Arvada, CO (US)

(73) Assignee: Accord Publishing Ltd., Denver, CO (US)

( * ) Notice: Subject to any disclaimer, the term of this patent is extended or adjusted under 35 U.S.C. 154(b) by 0 days.

(21) Appl. No.: 09/491,400

(22) Filed: Jan. 25, 2000

Related U.S. Application Data

(60) Provisional application No. 60/117,137, filed on Jan. 25, 1999.

(51) Int. Cl.7 ............................................... G09B 11/00
(52) U.S. Cl. ........................... 434/81; 434/83; 434/403; 434/428; 446/148; 281/15.1
(58) Field of Search .......................... 434/81, 83, 428, 434/402, 403, 397; 446/147, 148; 352/99; 281/15.1, 19.1, 19.2, 26, 51

(56) References Cited

U.S. PATENT DOCUMENTS

| | | |
|---|---|---|
| 1,028,921 A | 6/1912 | Wagner |
| 1,033,576 A | 7/1912 | Garman |
| 2,489,240 A | 11/1949 | Meyer .............................. 46/34 |
| 2,538,085 A | 1/1951 | Cotton .............................. 35/8 |
| 3,740,128 A * | 6/1973 | Adler ............................ 352/99 |
| 3,918,180 A | 11/1975 | Chamberlin |
| 4,092,786 A * | 6/1978 | Neese ......................... 352/99 X |
| 4,249,757 A * | 2/1981 | Gella ......................... 281/15 R |
| 4,365,438 A * | 12/1982 | Nelson ......................... 446/148 |
| 5,868,599 A * | 2/1999 | Kaufman ....................... 446/148 |
| 5,915,729 A | 6/1999 | Vap |
| 5,941,570 A | 8/1999 | Cole et al. |

* cited by examiner

Primary Examiner—Kien T. Nguyen
(74) Attorney, Agent, or Firm—Rick Martin; Patent Law Offices of Rick Martin, P.C.

(57) ABSTRACT

A child's 3D amusement book is created by forming at least two holes through the book and threading a string therethrough, or otherwise offixing a cord to opposing pages of a book or card. Parallel string segments are coordinated with drawings on the inner pages to create 3D and/or moving images.

16 Claims, 5 Drawing Sheets

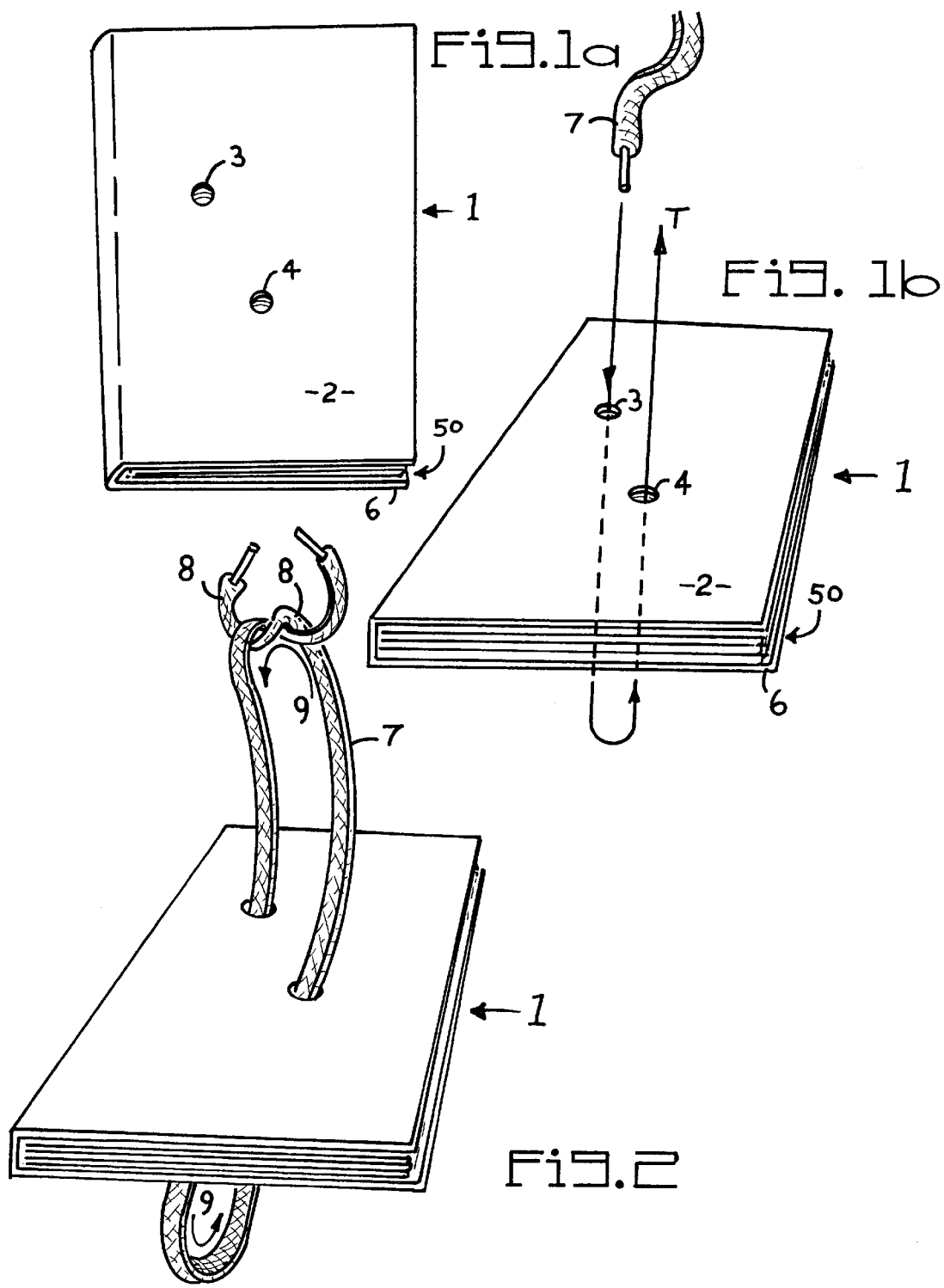

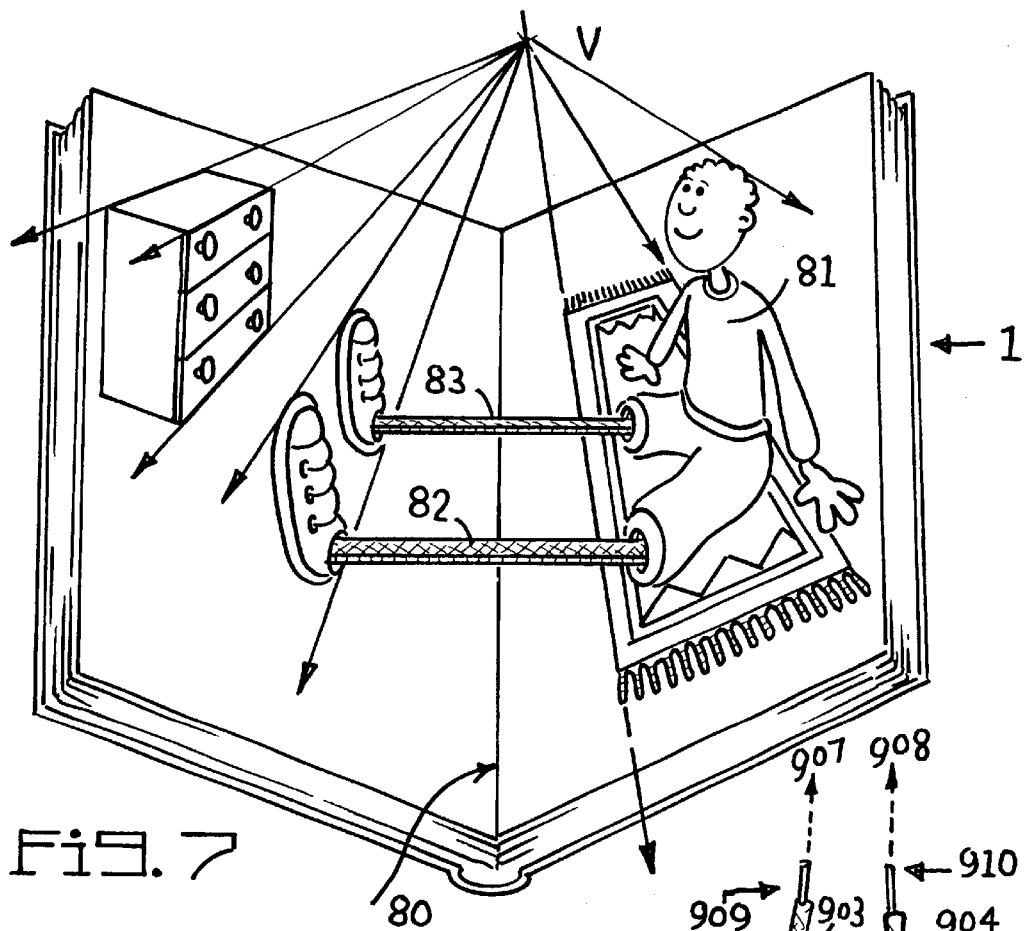
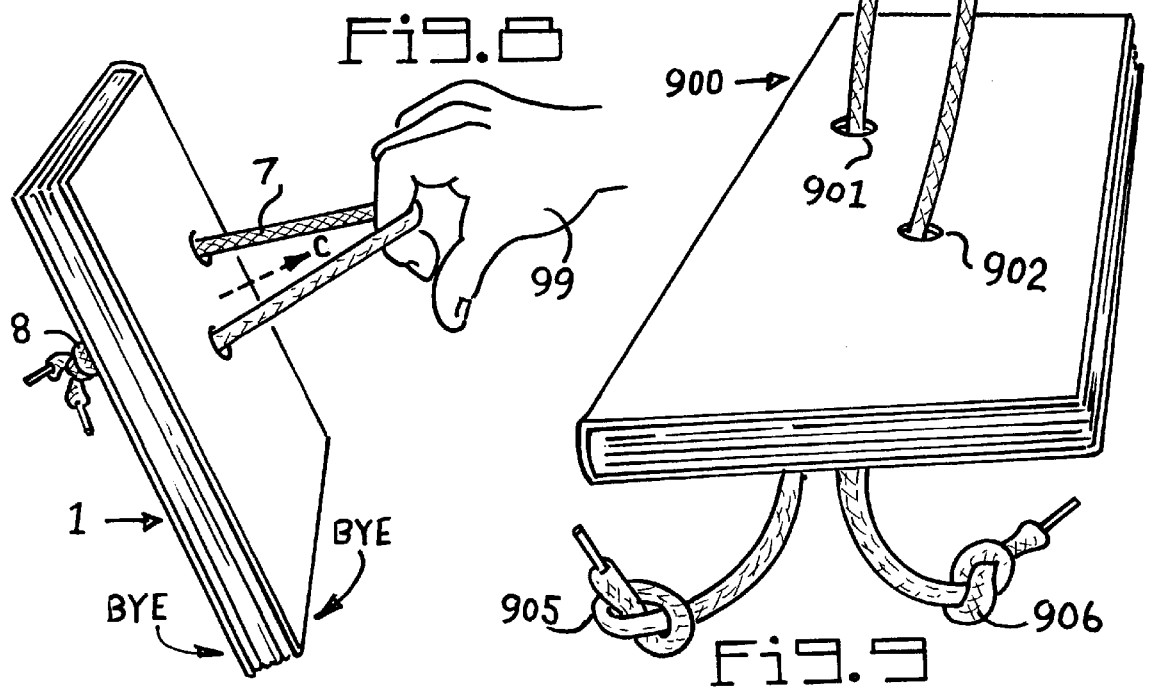

THREE-DIMENSIONAL SHOESTRING BOOK

CROSS-REFERENCE TO RELATED APPLICATION

This application is a non-provisional application claiming the benefits of provisional application No. 60/117,137 filed Jan. 25, 1999.

FIELD OF INVENTION

The present invention relates to an amusing, three-dimensional book using a shoestring, rope, cord, elastic, or fabric strung through the pages of the book to create 3D images in combination with figures drawn on the pages.

BACKGROUND OF THE INVENTION 3D books having pop-up figures are known for children. The figures enhance the amusement for the child and can create more true-to-life images than mere flat pages. It is known that for readers having normal 3D vision, that objects located both close and further back will form a 3D image in the mind.

Children can always use a novel toy-like book to get them reading. The present invention simply drills holes through a book and threads shoestrings therethrough. The shoestrings might form two human legs, one closer than the other, thereby forming a 3D image in the reader's mind.

SUMMARY OF THE INVENTION

The main aspect of the present invention is to provide one or more flexible cords through a book and coordinate figures on the pages with the cords so as to form 3D images.

Another aspect of the present invention is to coordinate the cords with a figure on the pages to simulate motion of the figure as the book is opened and closed such as a person doing push-ups.

Other aspects of this invention will appear from the following description and appended claims, reference being made to the accompanying drawings forming a part of this specification wherein like reference characters designate corresponding parts in the several views.

A toy book is comprised of a book and shoestring. When the book is opened, it can create a three-dimensional image in the form of a human, animal, insect, or inanimate object. Said three-dimensional image has a common visual such as two arms, two legs, two elephant trunks, found on each set of spread pages. The total effect is not limited to the effect of said body parts.

A string, rope, cord, or the like is woven through a hole in the book and looped back up through a second hole. Said book having two holed drilled entirely through the front, middle, and back of the book. The string is connected by a tied knot or other attachment device in such a way that the book can be opened 180 degrees or less. Books are normally opened 180 degrees from center whereas this invention has an optimal visual effect at approximately 120 degrees but is not limited to less than 180 degrees or more than 90 degrees for an adequate effect.

The string, rope, or cord serves a secondary purpose for this invention which is to aid or enhance a three-dimensional image found on all opened pages of the book. The string is seen visually in the form of two horizontal lines extending across a two-page spread. Said one horizontal line is longer than the other horizontal line. Therefore, the longer line appears to be closer while the shorter line appears to be farther away.

A three-dimensional image becomes apparent after appropriate artwork is added to the pages in a complimentary fashion. Said artwork is painted on the left and right page to correspond to the two horizontal lines found on both pages. The two horizontal lines will visually represent, for example, two arms or two legs depending on the subject matter or artwork chosen.

In the instance where the two horizontal lines represent legs, the finished artwork on the left and right correspond to compliment the effect. For example, a boy's face and body appear on the left page with arms extending onto the right page.

In another example, the artwork surrounding two stings, representing two legs, is painted in the proper perspective. The proper perspective drawing can easily be calculated with the use of an imaginary vanishing point found near the mid upper part of the book, preferably above the book. The said vanishing point is a common term and practice used by artists and architects. The appropriate perspective use of art will further enhance the three-dimensional effect.

All of the following elements work together in this invention to enhance the effect:

a) angle of pages;
b) perspective of artwork;
c) horizontal strings or lines away from book; and
d) one horizontal line longer than the other.

The two horizontal lines serve yet another purpose. As the book is slightly or gradually closed and opened, repeatedly and within a few degrees between the maximum opening (120 degrees) and closing to approximately 100 degrees, the strings appear to bend and stretch. This can be interpreted as knees or arms bending. One example would teach how this motion may appear to be a person doing push-ups.

A child can optionally be instructed to pull the slack of the string found on the back cover of the book after the book has been read or finished thereby preparing the book for the next reading. This is accomplished by pulling the loop outwardly from the back cover.

The book's pages are more readily and easily turned from page to page when the pages are made of a thick density of paperboard material. Accordingly, a child can easily turn the pages of the book and quickly identify the three-dimensional images without tearing or ripping the small holes found on each page. The string will bend slightly and adjust to the radius of the book as the pages are turned.

BRIEF DESCRIPTION OF THE DRAWINGS

FIG. 1a is a top perspective view of a closed book having two holes therethrough.

FIG. 1b is a top perspective view of the book in FIG. 1a with a string about to be strung through the holes.

FIG. 2 is a top perspective view of the book in FIG. 1b having the string tied into a securing know.

FIG. 7 is the same view as FIG. 6 with the next page partially turned.

FIG. 8 is a side perspective view of the book in FIG. 7 being closed by pulling the string.

FIG. 9 is a top perspective view of an alternate embodiment using two separate strings.

Figure 3A:
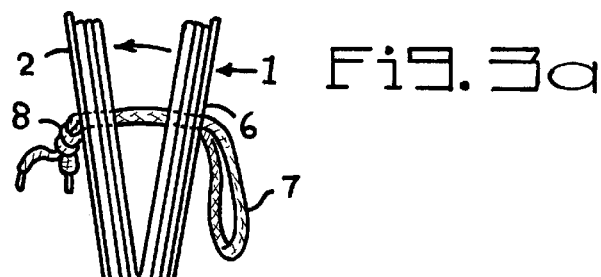
FIGS. 3a, 3b, 3c are bottom plan views showing the book in FIG. 2 in a partially-opened position (3a), a fully opened position (3b), and a fully opened position with a page turning (3c).

Before explaining the disclosed embodiment of the present invention in detail, it is to be understood that the invention is not limited in its application to the details of the particular arrangement shown, since the invention is capable of other embodiments. Also, the terminology used herein is for the purpose of description and not of limitation.

DESCRIPTION OF THE PREFERRED EMBODIMENT

Referring first to FIG. 1a a book 1 has a front cover 2, inner pages 50 and a back cover 6. In FIG. 1b a shoestring 7 is threaded T through holes 3, 4 which pass all the way through the front cover 2, inner pages 50 and back cover 6. In FIG. 2, the shoestring 7 is partially tied into a knot 8, thereby forming continuous loop 9 through the book 1. An equivalent (not shown) could use two separate cords, one through each hole 3, 4.

Figures 3B, 3C:
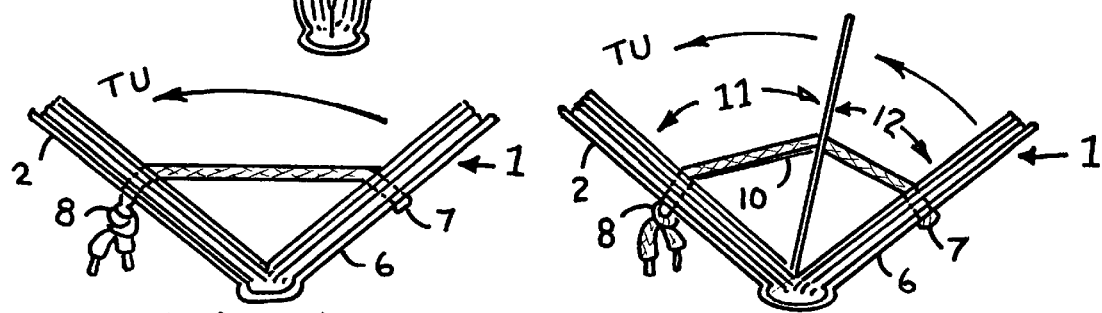

Referring next to FIGS. 3a, 3b, 3c the book 1 is being opened (3a) and then viewed (3b). In FIG. 3c, page 51 is being turned TU causing string 7 to bulge upward at 10, wherein the string 7 can support the page 51 at a partially-opened position in order to view two sets of drawings at 11 and 12 simultaneously.

Figure 4:
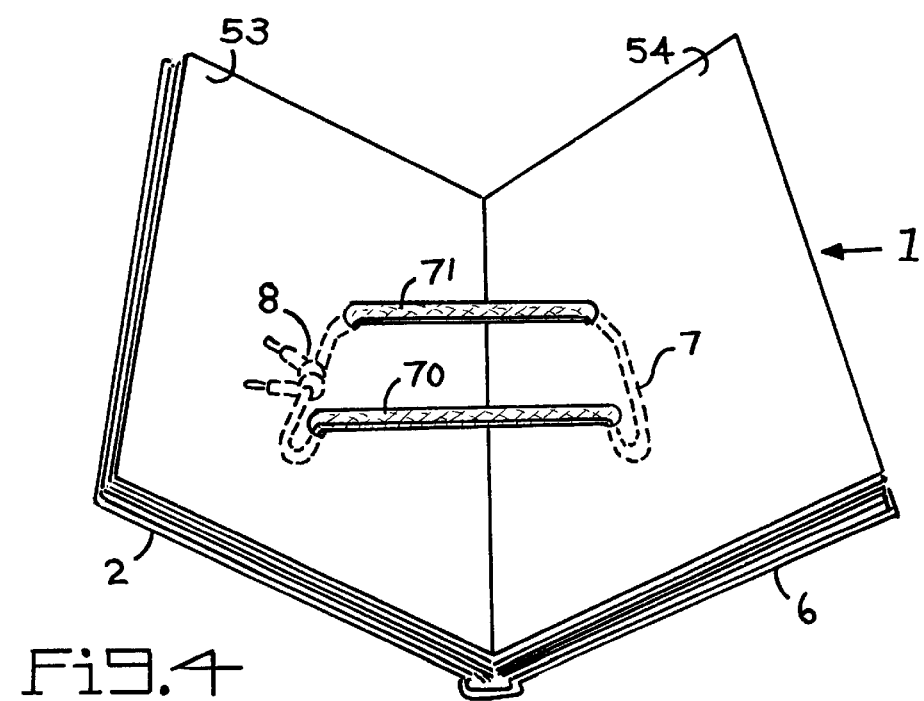
FIG. 4 is a top perspective view of the book in FIG. 3b.

FIG. 4 is a top perspective view of the book 1 in the fully-open position shown in FIG. 3b. String segment 70 is closer in and longer than string segment 71. The open pages 53, 54 could be doodle pages to allow the user to create his own 3D image and, with proper markers and page surfaces, erase the doodle when finished.

Figure 5:
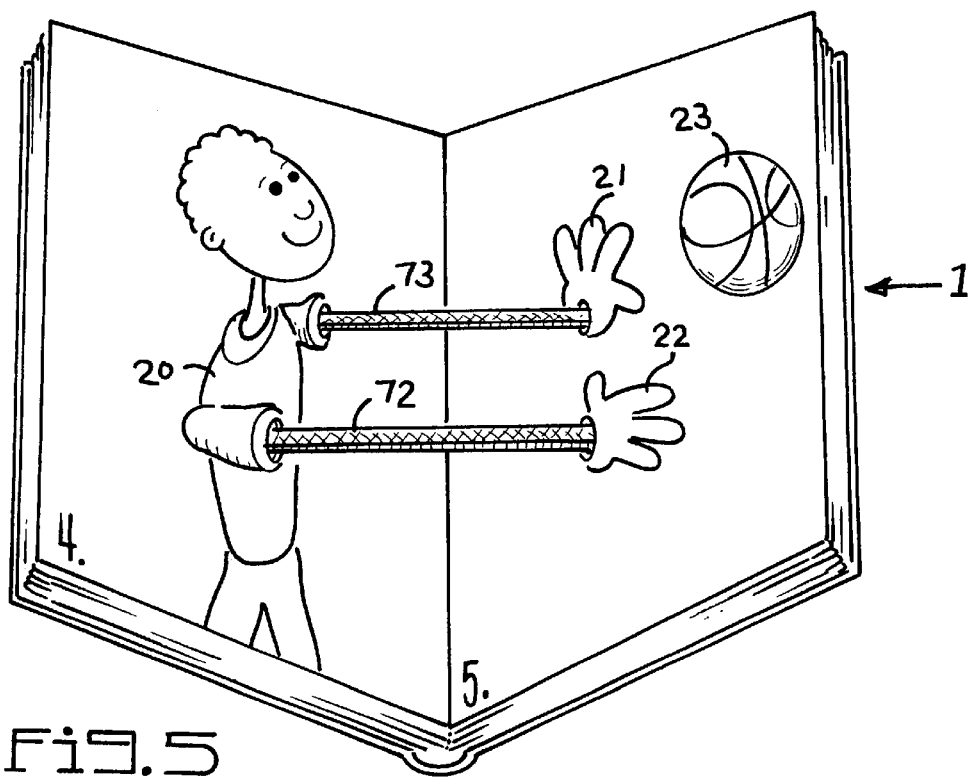
FIG. 5 a top perspective view as in FIG. 4 with the addition of a coordinated drawing on two opposing pages (the preferred embodiment).

Referring next to FIG. 5 pages 4 and 5 of the book 1 are exposed. The torso 20 has arms 72, 73 which are segments of string 7 in FIG. 4. Since arm 72 is closer in and longer than arm 73, the torso appears 3D with the ball 23 thrown out in space. By partially opening and closing page 4 relative to page 5, the torso 20 could be viewed as throwing the ball 23. By covering the ball 23, the torso 20 might be viewed as doing push-up on his hands 21, 22. Thus, the present invention provides the basis for an infinite variety of 3D and moving images for the graphic artist to create.

Figure 6:
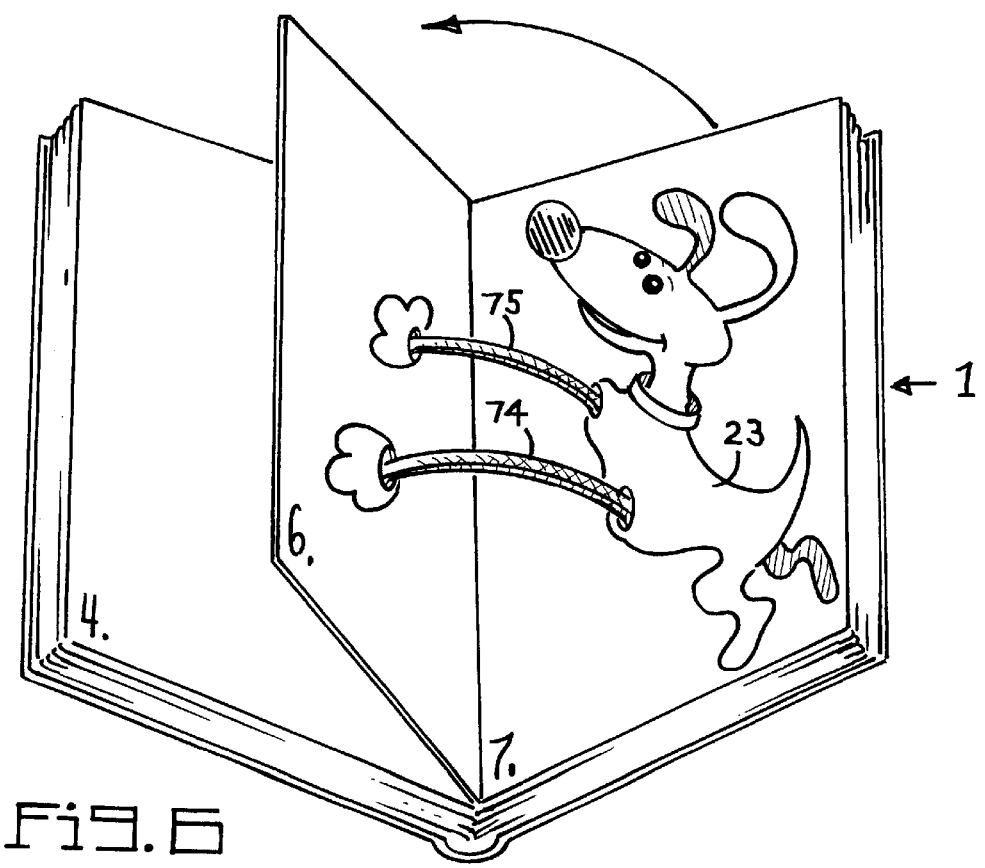
FIG. 6 is the same view as FIG. 5 with the next page partially turned.

Referring next to FIG. 6 the dog 23 had 3D arms 74, 75 which creates the image of the dog 23 jumping out of the book 1.

Referring next to FIG. 7 pages 8, 9 reveal a proper perspective drawing 80 wherein torso 81 has legs 82, 83. An imaginary vanishing point V is used to coordinate all aspects of the drawing 80 in harmony with the 3D legs 82, 83.

In FIG. 8 the child 99 pulls the string 7 in direction C closing his book 1 for the night, BYE BYE.

FIG. 9 shows a alternate embodiment book 900 having holes 901, 902 therethrough. Individual strings 903, 904 are threaded through the holes 901, 902. Knots 905, 906 secure one end of each string. Arrows 907, 908 indicate that the ends 909, 910 can be either tied together or tied into separate knots.

Figure 10:
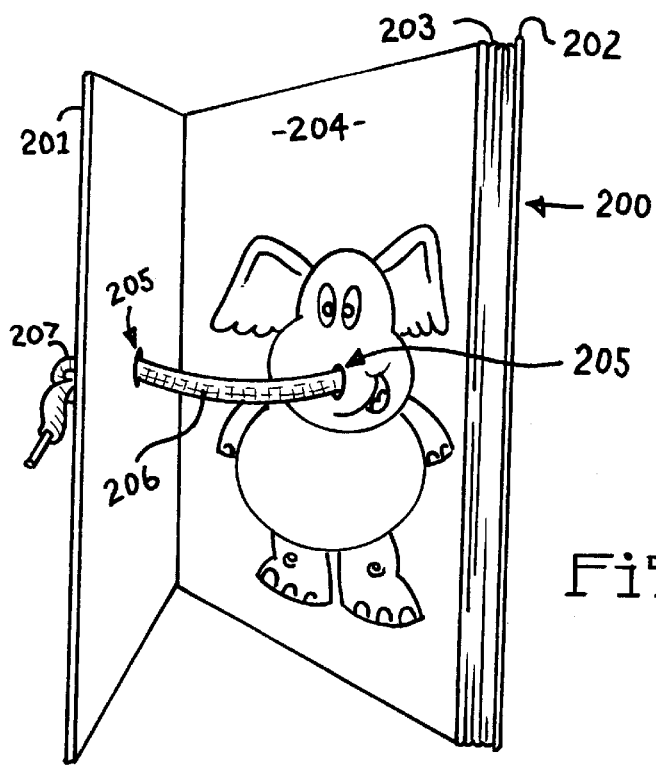
FIG. 10 is a front perspective view of a one string embodiment of a book.

Referring next to FIG. 10 a book 200 has a front cover 201, a back cover 202, and pages 203. A hole 205 runs through both covers and the pages. A cord 206 is held in place between the covers by knots 207. The cord 206 is coordinated with a viewing page 204 to create a 3D image as shown.

Figure 11:
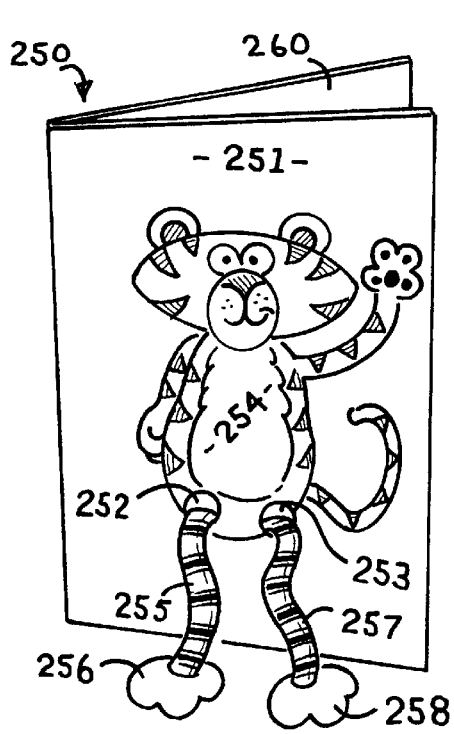
FIG. 11 is a front perspective view of a card embodiment, closed.
Figure 12:
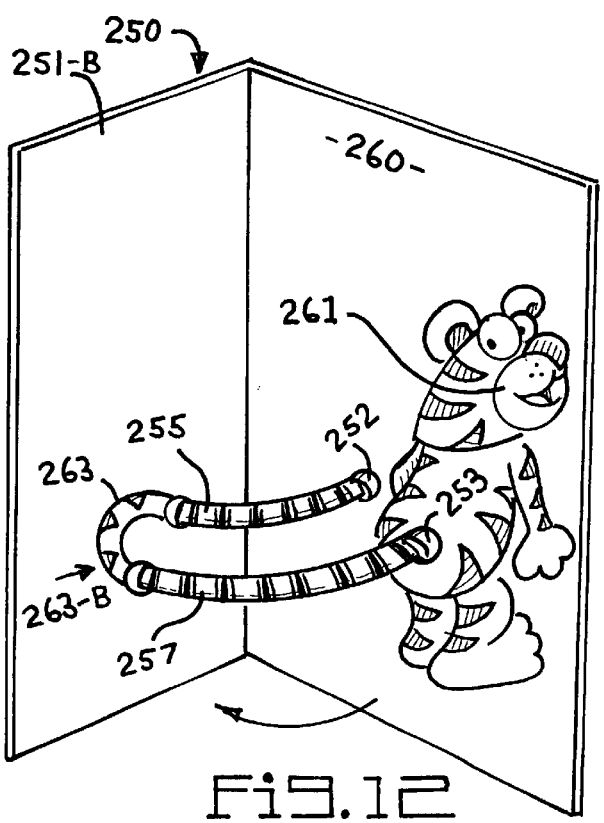
FIG. 12 is a front perspective view of the card embodiment, open.

Referring last to FIGS. 11,12 a card embodiment, card 250, is shown in FIG. 11 in the closed position. Front page 251 has a character 254 depicted thereon. Holes 252 and 253 allow cord segments 255,257 to hang therefrom. A 3D image of the character depiction (a tiger) is created with the cord segments 255,257 representing legs. Tiger feet 256,258 are actually plugs attached to the cord segments 255,257 to stop the cord segments from being pulled through the holes 252,253 when the card is opened as shown in FIG. 12.

In FIG. 12 the same cord segments 255,257 represent the 3D tail 263 of the cartoon character 261 of page 260. Thus, a single cord segment is coordinated with two characters on two pages of a single card. This same technique could be used on a multi-page book and the front cover. The artist in FIG. 12 has used the tail 263 to start on page 260, then extend to facing page 251-B, then use graphic depiction 263-B of a tail segment, then go from left to right back to page 260 to create a 3D image of one long element of a drawing (in this case a tail). This technique could also be used in a book.

Although the present invention has been described with reference to preferred embodiments, numerous modifications and variations can be made and still the result will come within the scope of the invention. No limitation with respect to the specific embodiments disclosed herein is intended or should be inferred.

I claim:

1. A 3D book comprising:
   a first page;
   a second page bound to the first page, thereby forming a first page viewing side which is opposite a second page viewing side when said book is in an open mode; and
   a pair of cords affixed to each of said first and second page viewing sides; and
   wherein each of said first and second page viewing sides comprise a coordinated drawing, wherein the pair of cords forms a 3D image with the coordinated drawing.

2. The book of claim 1, wherein said cords are affixed via a pair of holes, one each in said first and second pages.

3. The book of claim 2, wherein each of said cords further comprises a common continuous cord having a first and a second end.

4. The book of claim 3, wherein the first and second ends form a knot, thereby forming a continuous loop through the first and second pair of holes.

5. The book of claim 2 further comprising a number of pages greater than two, wherein each page has a pair of holes to receive said cords.

6. A 3D book comprising:
   a plurality of pages bound into a book;
   a pair of holes through said pages; and
   a first and a second string segment threaded through said first and second holes, thereby forming a pair of strings strung across a set of opposed open pages; and
   wherein the set of opposed pages further comprises a drawing, and the pair of string segments forms a 3D picture with the drawing.

7. The book of claim 6, wherein the string segments further comprises a single string further formed into a closed loop having a knot.

8. The book of claim 7, wherein the closed loop allows the book to be opened to less than 180°; and further provides a handle for the book in a closed position.

9. The book of claim 6, wherein the pair of string segments further comprises a long member and a short member; said long and short members adding a further 3D effect to said 3D picture.

10. The book of claim 9, wherein the 3D picture further comprises an imaginary vanishing point V to coordinate all aspects of the drawing in harmony with the long and short members.

11. The book of claim 6 further comprising a front and a rear cover.

12. A book comprising:
  a hole through the book; and
  a cord secured through the hole, wherein each page of the book can turn relative to the cord moving through a hole in the page;
  said book further comprising a second hole and a second cord affixed therethrough; and
  wherein a set of opposed pages presents a 3D drawing to a reader, said 3D drawing using the cord and second cord as a 3D highlight.

13. The book of claim 12, wherein the cord and second cord form a continuous loop.

14. A method to simulate motion in a drawing which is spread across a pair of opposed pages, said method comprising the steps of:
  forming a two page drawing;
  forming a hole through the two pages;
  threading a cord through the hole;
  affixing the cord to the two pages; and
  opening and closing the two pages;
  said method further comprising the step of forming a second hole and threading a second cord therethrough; and
  said method further comprising the step of using an imaginary vanishing point to coordinate the drawing and the two cords to form a 3D image.

15. A 3D card comprising:
  a front and a back page hinged together;
  said pages having an open and a closed mode; and
  a cord attached to an inside face of the front page and to a front face of the back page;
  wherein the pages each have a hole and the cord is secured therein;
  wherein a front viewing side of the front page has a depiction using the card as a 3D extension; and
  wherein an inside viewing page of the back page has a second depiction using the cord as a 3D extension.

16. The 3D card of claim 15, wherein the cord has a plug which coordinates with the depiction.

* * * * *